Oct. 19, 1971   E. S. PERKINS ET AL   3,613,247
X-Y PLOTTER
Filed Aug. 22, 1969   2 Sheets-Sheet 1

INVENTORS
EARL STUART PERKINS
DANIEL A. WIERZBOWSKI

BY ATTORNEYS

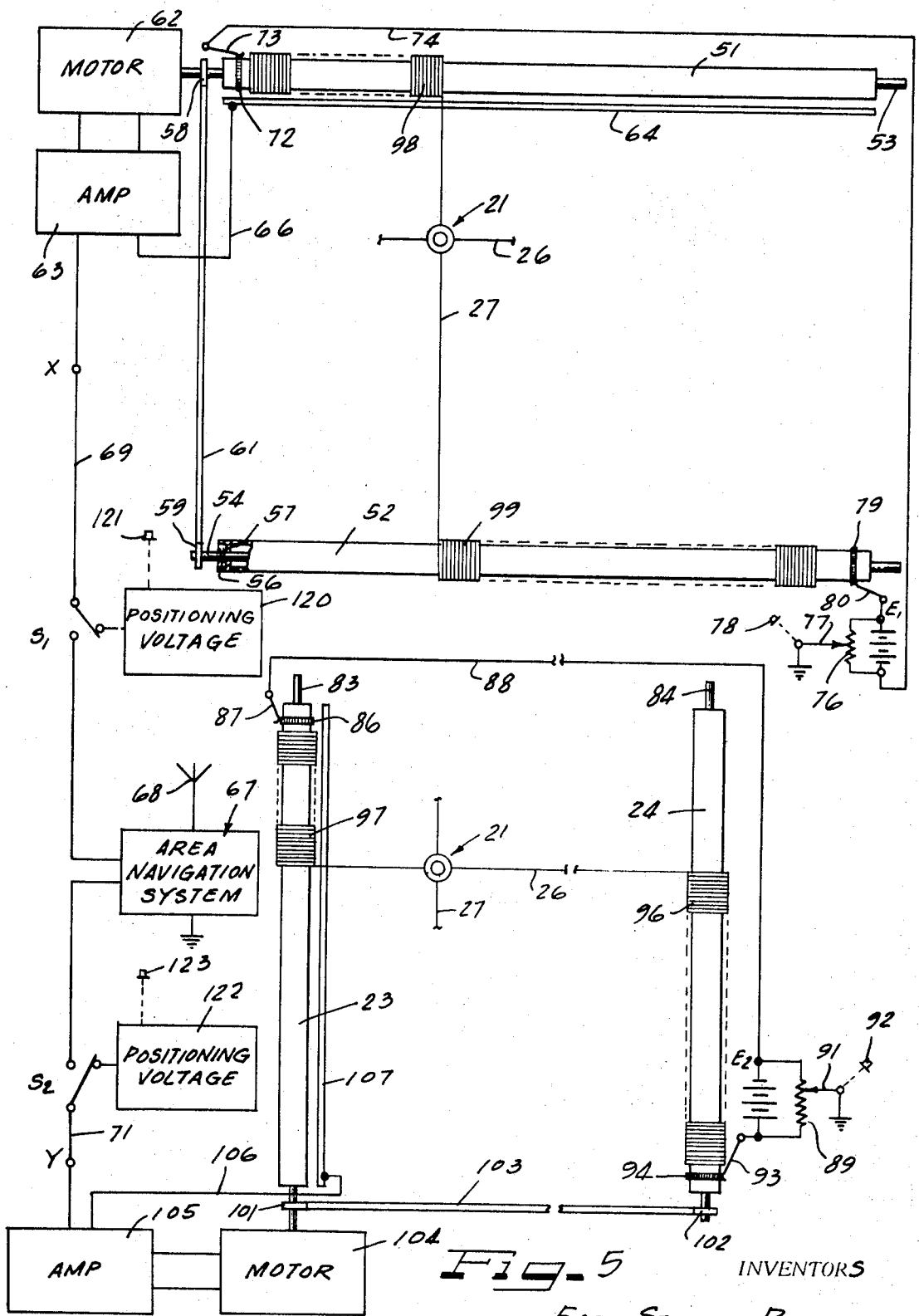

United States Patent Office 3,613,247
Patented Oct. 19, 1971

3,613,247
X–Y PLOTTER
Earl Stuart Perkins, Oak Brook, and Daniel A. Wierzbowski, Downers Grove, Ill., assignors to Butler National Corporation, Oak Brook, Ill.
Filed Aug. 22, 1969, Ser. No. 852,403
Int. Cl. B43i 5/00
U.S. Cl. 33—1 M    13 Claims

ABSTRACT OF THE DISCLOSURE

An X–Y plotter for use with an area navigation system, for example, which utilizes resistance wire wound about and extending between spaced rollers which are driven to position an indicator block mounted on the wire between the rollers. An indicator is rotatably mounted on the block and has a portion which frictionally engages a transparent layer to indicate the most recent direction of movement of the indicator.

BACKGROUND OF THE INVENTION

Field of the invention

This invention relates, in general, to plotting devices and in particular to a twin axis X–Y plotter.

Description of the prior art

Prior twin axis plotters have positioned indicators in the X and Y directions and have provided position feedbacks from slide wire contacts which are respectively aligned with the X and Y positions of the indicator. The indicator has normally had a moving spot indicia or indicia fixed relative to the plotter so that no indication has been given of the direction of movement of the plotter when it is static.

SUMMARY OF THE INVENTION

The present invention comprises an X–Y plotter which has an indicia with a rotatable indicator which has a portion that frictionally engages a transparent sheet so that as the indicator moves relative to the transparent sheet the indicator will indicate the direction of travel by showing the heading of the indicia. The indicator is positioned by a pair of resistance wires that are wound about spaced apart insulated rollers that are driven to respectively position the indicator in the X and Y directions. The motors are driven by X and Y command signals and position feedback signals are supplied by wiper contacts between the rollers which engage the resistance wire and supply inputs to the motors.

Tensioning means are provided to hold the resistance wires taut between the rollers.

BRIEF DESCRIPTION OF THE DRAWINGS

Other objects, features and advantages of the invention will be readily apparent from the following description of a preferred embodiment thereof, taken in conjunction with the accompanying drawings, although variations and modifications may be effected without departing from the spirit and scope of the novel concepts of the disclosure, and in which:

FIG. 5 is a schematic view of the X–Y plotter of this invention.

DESCRIPTION OF THE PREFERRED EMBODIMENT

Figure 1:
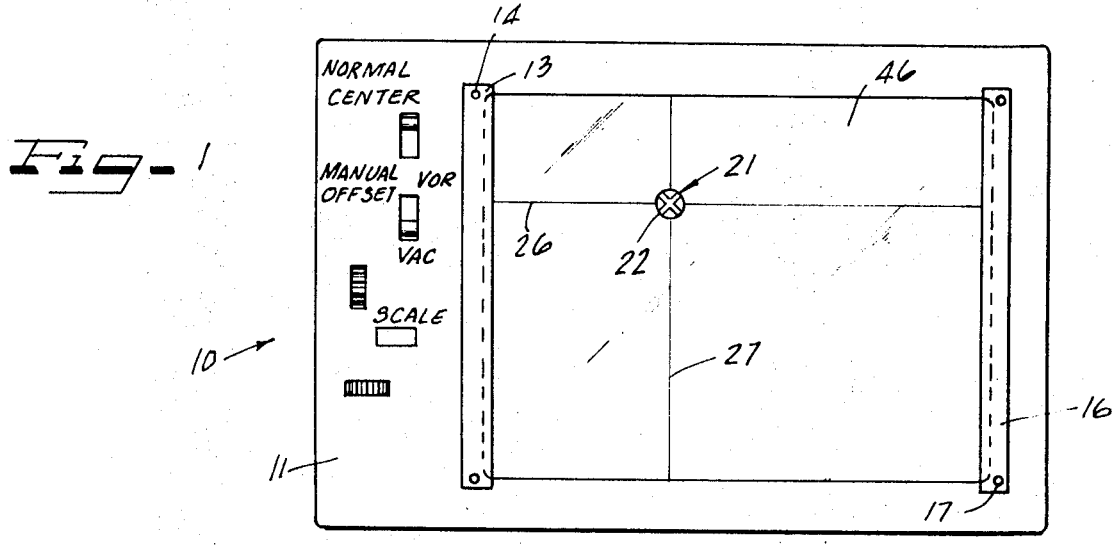
FIG. 1 is a top plan view of the recorder of this invention.
Figure 2:
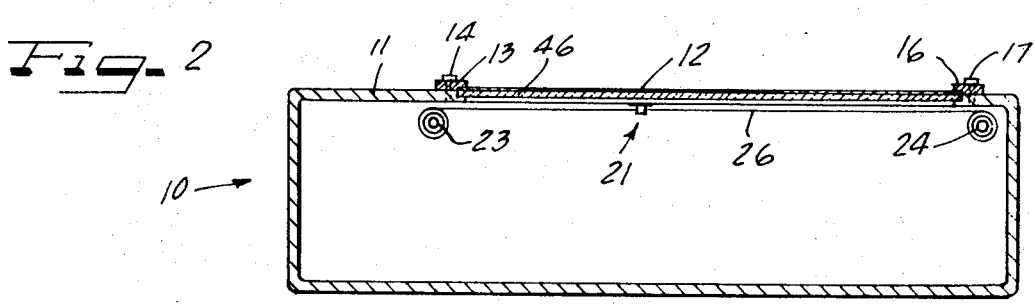
FIG. 2 is a sectional view of the recorder.

FIG. 1 illustrates the X–Y plotter of this invention which comprises a case 10 with a top 11. A pair of holding clamps 13 and 16 are supported on the top 11 by suitable screws 14 and 17, respectively, for holding a transparent or semi-transparent sheet or map 12 to the plotter. An indicator designated generally as 21 has aircraft indicia 22 which is supported by the plotter below the top 11 and is visible through the sheet 12 and a transparent sheet 46 which is attached to the top 11 and supports the sheet 12. The indicator 21 is formed with a pair of transverse openings through which supporting wires 26 and 27 extend. The wire 26, for example, is supported on rollers 23 and 24 as best shown in FIG. 2 and may be moved up and down relative to the FIG. 1 by rotating the rollers 23 and 24 to cause the indicator 21 to move up and down relative to FIG. 1. Likewise, the wire 27 is mounted on rollers 51 and 52, as best shown in FIG. 5, and can be moved to the left or right relative to FIG. 1 by rotating the rollers 51 and 52 to cause the indicator 21 to move to the left or right relative to FIG. 1. The combined motion of the wires 26 and 27 can cause the indicator 21 to move to any point on the field of the map 12 since their intersection point determines the position of the indicator 21.

Figure 3:
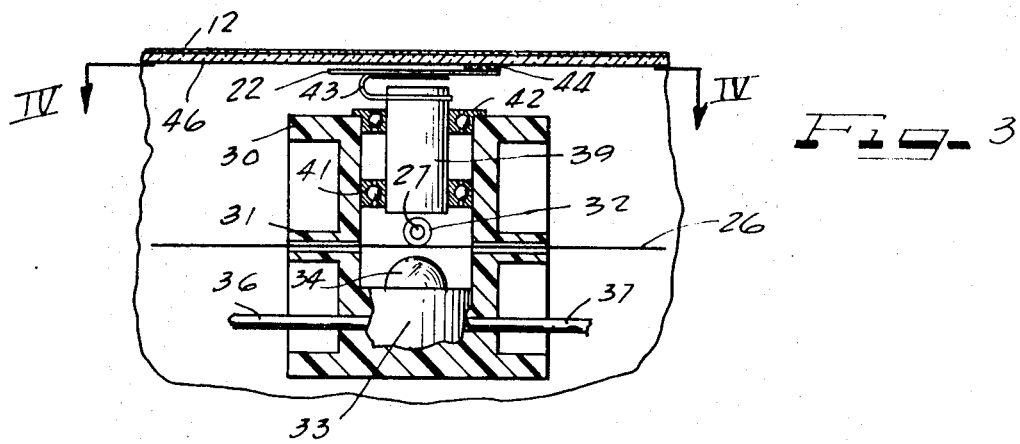
FIG. 3 is an enlarged detail view of the indicator block of this invention.
Figure 4:
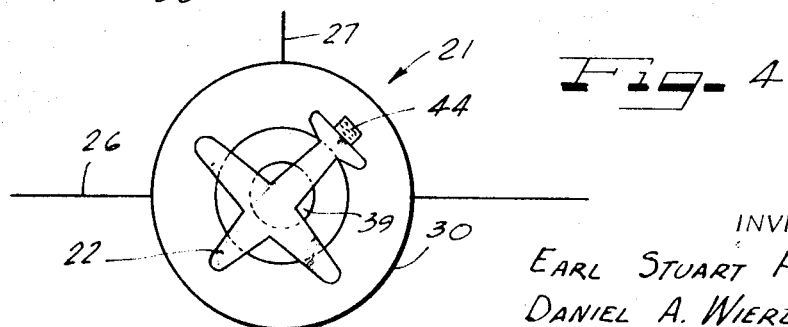
FIG. 4 is a top view of the indicator block of this invention indicating the indicia.

The indicator 21 is shown in detail in FIGS. 3 and 4. It is to be noted that the indicator 21 comprises a cylindrical member 30 of Plexiglas or other suitable material formed with a first opening 31 through which the slide wire 26 extends and a second opening 32 which is at right angles to opening 31 through which the slide wire 27 extends. A lamp holder 33 is mounted in the body portion 30 and carries a lamp 34 which may be powered through the leads 36 and 37. An indica supported 39 is rotatably mounted by bearings 41 and 42 from the body portion 30 and supports the indicia 22 with a generally U-shaped spring member 43 which has one end attached to the indicia support 39 and carries the aircraft indica 22 at its other end. The aircraft indica 22 has a friction pad 44 which might be made of felt or plastic on one end as, for example, indicated on the aft end in FIG. 3 and FIG. 4 which is frictionally urged against the plastic sheet 46 of the plotter by the spring 43. Since the pad 44 is offset from the center axis of the bearings 41 and 42 and the member 39 it will cause the indicator 22 to rotate due to friction between the friction pad 44 and the sheet 46 as the indicator 21 moves relative to the plotter. For example, as illustrated in FIG. 4, the indicator 21 has last moved toward the lower left relative to the figure thus causing the aircraft to take a heading as shown because of the friction of the pad 44 against the sheet 46.

The friction pad 44 causes the aircraft indicia 22 to indicate the aircraft's course relative to the map 12 as the aircraft indicia is moved on the field of the map and the navigator and pilot may observe the correct plan orientation of the aircraft relative to the map.

FIG. 5 illustrates in detail how the indicator 21 is moved relative to the X–Y plotter of the invention. The slide wire 27 which extends through the indicator 21 is wound about rollers 51 and 52 which may be made of insulating material and between which the wire 27 extends. The wire 27 and wire 26 might be constructed of piano wire, for example, such as music wire of $10/_{1000}$ diameter and may be wound on the rollers 51 and 52 with about forty turns per inch. Numeral 98 indicates the portion of the wire wound about the roller 51 and numeral 99 indicates the portion of the wire wound about the roller 52. The end of portion 98 is connected to a slip ring 72 mounted on roller 51 which is slidingly engaged by a brush 73. The end of the portion 99 is connected to a slip ring 79 which is engaged by a slip ring 80. The rollers 51 and 52 may be formed with grooves for assuring that the slide wire 27 moves uniformly to the left and right relative to FIG. 5 as the rollers 51 and 52 are rotated. The roller 51 is mounted on a shaft 53 which is driven by a motor 62. The shaft 53 carries a gear 58. The roller 52 is mounted on a shaft 54 which carries a gear 59 and a belt or other suitable drive means 61 is connected to the gears 58 and 59 to drive the rollers together. The roller 52 is loosely supported on the shaft 54 and a spring 56 is connected to the shaft 54 and to a portion 57 of the roller 52 to cause spring tension to be exerted on the portion 27 of the slide wire between the rollers 51 and 52 to so hold the wire 27 taut.

An electrical conductor 74 is connected to brush 73 and is connected to one terminal of a voltage source as, for example, the battery $E_1$. The brush 80 is connected to the other terminal of the battery $E_1$. A resistor 76 is connected in parallel with the battery $E_1$ and has a wiper contact 77 that is connected to ground. A knob 78 is connected to the wiper contact 77 for adjusting the contact. A wiper contact 64 extends for the full length of the roller 51 and engages the slide wire 27 at all times. Thus, as the wire 27 moves to the left or right relative to FIG. 5, it will make electrical contact with the wiper 64. A conductor 66 is connected to wiper 64 and supplies an input to an amplifier 63 which is connected to the motor 62. An X input signal is applied by lead 69 from a suitable source of signal for driving the plotter. By way of example, the X input of the plotter might be supplied by an area navigation system 67 which receives an input from the antennae 68 and produces an X command signal on lead 69 and a Y command signal on lead 71 to drive the indicator 21.

The structure for moving the slide wire 26 is similar to that for driving the slide wire 27 except the slide wire 26 is moved vertically relative to FIG. 5. For purposes of illustration, the rollers 23 and 24 are shown below relative of FIG. 5 of the rollers 51 and 52 although it is to be realized that they would be superposed above each other in the actual plotter so that the simultaneous movement of the wires 26 and 27 would move the indicator 21. The roller 23 is driven by motor 104 which has an output shaft 83 upon which gear 101 is supported. The roller 24 is supported on shaft 84 which carries gear 103 and a belt or other suitable driving means 103 extends between the gears 101 and 102. One portion 97 of the slide wire 26 is wound about the roller 23 and has its end connected to a slip ring 86 which is engaged by wiper brush 87. Likewise, the other end of slide wire 26 has a portion 96 which is wound about the roller 24 and has its end connected to a slip ring 94. Brush 93 engages slip ring 94. Brush 87 is connected by lead 88 to one end of a battery $E_2$ and the other end of a battery $E_2$ is connected to brush 93. A resistor 89 is connected in parallel with the battery $E_2$ and a slide contact 91 engages the resistor 89 and may be adjusted by the knob 92. A wiper contact 107 extends for the length of the roller 23 and engages the slide wire 26. Lead 106 supplies an input from the contact 107 to amplifier 105. Amplifier 105 also receives the Y input from lead 71 from the area navigation system 67 and supplies an input to a motor 104 which drives the rollers 23 and 24.

In operation, a map 12 is placed under the clamps 13 and 16 with the proper orientation and the indicator 21 may be positioned to the known position of the aircraft relative to the map 12 by applying positioning voltages to the leads 69 and 71. For this purpose, a positioning voltage source which may be an adjustable DC voltage is available from voltage source 120 which has an adjusting knob 121 and the output of the positioning voltage source 120 may be connected by switch $S_1$ to lead 69 to drive the rollers 51 and 52 through motor 62. Likewise, a positioning voltage source 122 may be connected by switch $S_2$ to lead 71 and adjusted by knob 123 to drive the slide wire 26 by moving rollers 23 and 24 to the proper initial position. The wiper contacts 64 and 107, supply feedback signals to the motor 62 so that them motor drives the slide wires 26 and 27, respectively, until the indicator 21 is positioned to the commanded position.

After the indicator 21 has been properly oriented relative to the map, the switches $S_1$ and $S_2$ are moved to connect leads 69 and 71 to the output of the area navigation system 67 and the indicator will move as commanded to indicate the aircraft's position relative to the map 12. If, in FIG. 5, for example, the aircraft is moving generally in a southeasterly direction, indicator 21 will move downwardly and to the right relative to FIG. 5 to indicate to the pilot relative to the map 12 his relative motion on the map 12. This is caused by the simultaneous drive of motors 62 and 104 wihch move the slide wires 26 and 27, respectively, to drive the indicator. Due to the frictional engagement of the friction pad 44 with the sheet 46, the indicator 22 will be rotated on the bearings 41 and 42 so that the direction that the aircraft is moving in will be indicated on the plotter. It is to be particularly noted that the friction pad 44 is off-center with the rotational axis of the member 39 so that the friction causes the indicator to take an orienation which indicates the aircraft's course.

It is to be realized, of course that the rollers 23 and 24 are provided with a tensioning means such as the spring 56 which tensions the roller 52 and maintains the slide wire 27 in tension.

It is seen that the invention provides a new and improved plotter which indicates the aircraft's heading through the provision of a rotatably supported indicator which has a friction pad that engages the supporting plate of the plotter and although it has been described with respect to preferred embodiments, it is not to be so limited as changes and modifications may be made within the full intended scope as defined by the appended claims.

We claim:
1. An X-Y plotter comprising:
    a frame member formed with a transparent window;
    an indicator supported to be visible through said window;
    a flexible tension member extending across said window and in engagement with said indicator to move it and formed of electrically conducting material;
    a pair of rollers mounted parallel to each other on said frame and the ends of said tension member wound about said rollers;
    means for driving said rollers so that said indicator moves in said window in the direction of the longitudinal axis of said rollers;
    means for applying a potential to said flexible tension member; and
    a wiper contact in engagement with said tension member between said rollers and supplying a position follow-up signal to said driving means.

2. An X-Y plotter according to claim 1 wherein said means for applying a potential to said flexible tension member includes a first slip ring mounted on one of said rollers and connected to one end of said tension member, a second slip ring mounted on the other of said rollers and connected to the other end of said tension member, a pair of brushes in enaggement with the first and second slip rings, and a power source connected to said pair of brushes.

3. An X-Y plotter according to claim 2 comprising a second tension member extending across said window at right angles to said first tension member and in engagement with said indicator to move it and formed of electrically conducting material, a second pair of rollers mounted parallel to each other on said frame at right angles to said first pair of rollers and the ends of said second tension member wound about said second rollers, and second driving means for driving said second rollers so that said indicator moves in the direction of the longitudinal axis of said second rollers.

4. An X-Y plotter according to claim 3 comprising means for applying a potential to said second flexible tension member, and a second wiper contact in engagement with said second tension member between said second pair of rollers to supply a position follow-up signal to said second driving means.

5. An X-Y plotter according to claim 4 wherein said means for applying a potential to said second flexible tension member includes a third slip ring mounted on one of said second pair of rollers and connected to one end of the second tension member, a fourth slip ring mounted on the other of said second pair of rollers and connected to the other end of the second tension member, a second pair of brushes in engagement with said third and fourth slip rings, and a second power source connected to said second pair of brushes.

6. An X-Y plotter according to claim 5 comprising means for maintaining the portion of the first flexible tension member between said first pair of rollers fast.

7. An X-Y plotter according to claim 5 comprising means for maintaining the portion of said second flexible tension member between said second pair of rollers fast.

8. A X-Y plotter accordng to claim 3 wherein said indicator is formed with a pair of openings which extend at right angles to each other and said first and second tension members extend therethrough.

9. An X-Y plotter according to claim 8 comprising a movable indicia connected to said indicator and in engagement with said window so that movement of the indicator positions the indicia to indicate the direction of travel.

10. An X-Y plotter according to claim 9 wherein said indicia is rotatably supported by said indicator.

11. An X-Y plotter according to claim 9 wherein said indicia is rotatably supported on an axis at right angles to the plane of the window and said indicia includes a friction pad which engages the surface of said pad attached to the indicia.

12. An X-Y plotter according to claim 14 wherein said friction pad is attached to the indicia at a position off-set from said axis which rotatably supports said indicia.

13. An X-Y plotter according to claim 12 including illuminating means attached to said indicator so that said indicia will be clearly visible through said window.

References Cited

UNITED STATES PATENTS

| | | | |
|---|---|---|---|
| 2,562,695 | 7/1951 | Brown | 33—80 X |
| 2,600,484 | 6/1952 | Copping | 33—1 C |
| 2,891,314 | 6/1959 | Haschek | 33—1 M |
| 3,024,396 | 3/1962 | Peckjian | 33—1 M |
| 3,182,399 | 5/1965 | Price | 33—1 XM |
| 3,492,421 | 1/1970 | Cameron | 33—1 XM |

WILLIAM D. MARTIN, JR., Primary Examiner

U.S. Cl. X.R.

33—189